United States Patent [19]

Mogard

[11] 4,004,972
[45] Jan. 25, 1977

[54] NUCLEAR FUEL ELEMENT

[75] Inventor: Johan Hilding Mogard, Lidingo, Sweden

[73] Assignee: Aktiebolaget Atomenergi, Stockholm, Sweden

[22] Filed: Jan. 30, 1974

[21] Appl. No.: 437,871

[30] Foreign Application Priority Data

Feb. 2, 1973 Sweden ............................ 7301524

[52] U.S. Cl. .................................................. 176/81
[51] Int. Cl.² ......................................... G21C 3/18
[58] Field of Search ................ 176/66, 67, 68, 72, 176/73, 76, 77, 78, 81

[56] References Cited
UNITED STATES PATENTS

| 3,072,555 | 1/1963 | Barth et al. | 176/72 |
| 3,262,860 | 7/1966 | Zebroski | 176/81 |
| 3,352,757 | 11/1967 | Dee et al. | 176/72 |
| 3,697,373 | 10/1972 | Emon et al. | 176/81 |
| 3,697,375 | 10/1972 | Suvanto et al. | 176/78 |

*Primary Examiner*—Stephen C. Bentley
*Attorney, Agent, or Firm*—Toren, McGeady and Stanger

[57] ABSTRACT

Nuclear fuel element for use in power producing nuclear reactors, comprising a plurality of axially aligned ceramic cylindrical fuel bodies of the sintered type, and a cladding tube of metal or metal alloys, wherein said cladding tube on its cylindrical inner surface is provided with a plurality of slightly protruding spacing elements distributed over said inner surface.

8 Claims, 7 Drawing Figures

NUCLEAR FUEL ELEMENT

The present invention relates in general to the conventional ceramic pellet type fuel elements now commonly used in power producing nuclear reactors. Characteristically, each fuel element (fuel rod) comprises a plurality of short cylindrical pellets of sintered ceramic fuel material, generally oxides of the fissile metals. These fuel pellets are stacked on top of each other to form a long continuous column. This pellet is encapsulated within a tight-fitting cladding tube of a suitable metal or metal alloy. Both ends of the cladding tube are seal welded by end plugs. Usually also a filling gas, generally helium, is enclosed within the fuel element for heat transfer purposes.

In particular, the invention concerns the fuel elements of light water power reactors (LWR). The two variants, the boiling water reactor (BWR) and the pressurized water reactor (PWR) are dominating as power producing systems of the present commercial nuclear reactors.

Although the experience of the operation of f.e. the LWR fuel element in general has been acceptable, there are still some severe problems associated with its safe and reliable use, in particular under certain modes of operation and under some postulated accidental conditions.

The extent and characteristics of the occasionally developing defects are sometimes of such a severe nature that a continued operation is made difficult or impossible, in particular at high fuel heat ratings, high fuel burn up levels and great increase of fuel heat ratings. For these reasons the maximum specified heat rating of operating reactors has been lowered and some restrictions in the modes of power operation have been introduced lately. Recent increased safety demands also have called for lower fuel heat ratings but also for the best possible heat transfer between pellet and cladding to minimize the amount of stored energy of the fuel element.

To be of any practical significance, any improvements with respect to the operational reliability of the fuel element thus must simultaneously meet the imposed safety demands. The present invention is based on this understanding.

The invention considers the more severe fuel element defects occurring during normal operation and proposes means in form of a modified design of the fuel element to effectively reduce the development of such defects. Simultaneously the modified fuel design conforms with the increased safety requirements. It also provides means to improve certain safety features of the fuel element.

In the first hand the invention considers the type of defects which develop as small cracks propagating through the fuel cladding caused by a severe mechanical interaction between fuel pellet and cladding. The invention also takes into consideration the type of defect that manifests itself as local axial separation of the enclosed long column or stack of pellets in two separate parts to form an opening of the magnitude of some centimeters therebetween. Moreover, the invention relates to other phenomena affecting reliability, as will be described later.

The crack defects result in a release of radioactive fission products to the cooling water system causing an undesirable contamination of said system and possibly radioactive leakage out to the environment. The presence of the separation defects may involve the fact that established safety criteria for the reactor operation can no longer be fulfilled. The inconveniences and the safety implication of such defects may therefore be extensive and the corrective measures expensive with regard to the owners of reactors as well as the fuel manufacturers.

The phenomenological background to the creation of these types of defects is quite well known and described in the literature. Therefore, the relevant mechanisms of damage are presented below only to the extent that this is necessary for the presentation and the understanding of the invention.

Mechanical interaction between pellets and cladding arises in operation above a certain power level of the fuel element and may result in high stresses and plastic deformation in the cladding tube. These stresses will become particularly severe when the heat rating of the element is suddenly increased considerably above a previously constant level of power. The cladding cracks start from the inside surface of the tube and initiate at the areas thereof which are subject to the highest stresses and the largest deformations when the pellets expand thermally during the power increase. Particularly exposed areas of the bulges (circumferential ridges) formed on the cladding tube at the positions of the pellet-pellet interfaces, i.a. in view of the hourglass-like shape the pellets tend to take.

The mechanism of the crack formation calls for a high friction between pellet and cladding so as to make sliding in the contact zone more difficult. This results in high local tensions, particularly in the extremely delimited areas of the interior of the cladding tube lying close and opposite to a widening crack in the heavily engaging pellet. The ability of the cladding material to withstand such extremely localized deformation is delimited and, moreover, it is extensively reduced, particularly as regards Zircaloy, by the embrittling of the material as a result of the reactor irradiation. Furthermore, the presence of chemically active fission products like iodine and contaminants like fluorine may facilitate the initiation of the cracks in the cladding by so-called stress corrosion.

The stress pattern at the formation of such cladding fractures is often of the biaxial type, the circumferentially oriented stress component being predominating. Therefore, the cracks generally propagate in the longitudinal direction of the cladding tube.

This type of mechanical interaction becomes particularly pronounced at relatively high burn-up levels, say about 10,000 MWD/tU (mega watt days per ton uranium) and higher. In order to minimize the rate of defect formation certain precautions in the fuel operation are therefore taken. The extent and rate of power increase is restricted to a minimum and power variations in general are avoided. Of course, such restrictions are undesirable from an operational point of view.

As regards the afore-mentioned separation type defect in the pellet column, this defect may result from a continued densification or sintering of the pellets taking place in the reactor. The deleterious effect of the pellet separation lies mainly in the fact that it results in a local power peak at the pellet opening which may affect the established power safety margin. Under the influence of the high coolant pressure the cladding tube may also be pressed into or collapse in the axial opening of the pellet column. This results in further unintentional local increase of power. As a result of the local deformation the cladding material may fracture in the area due to the collapse.

Separation defects of this kind may also result from other phenomena than densification, such as "ratcheting" and "growth", which phenomena both primarily present themselves as a continued length increase of the cladding under extended reactor operation and may take unacceptable proportions. Under the continued length increase a part of the enclosed pellet column may be carried along so as to form an axial local opening in the same.

Common to the mechanism behind the phenomena resulting in separation defects is the existence of a small but repeated movement or downfall of the pellets inside the cladding tube within the part of the pellet column lying below the opening, so that this part is progressively packed and the opening enlarged.

Separation defects due to densification arise already at moderate burnt-up levels and influence the safety status in a disadvantageous way. Therefore, they are not acceptable if the relevant safety margins are already fully utilized at specified operating power level.

The improvements provided by the invention influence said damage mechanism with regard to mechanical interaction as well as pellet separation to such an extent that they are eliminated or almost entirely prevented to arise.

The invention also counteracts other potentially damaging processes within the fuel element during operation. These are presented in connection with the description of the invention below.

One main object of the invention is thus to improve the normal operational reliability of the fuel element, essentially as regards destructive effects of mechanical fuel-clad interaction during certain modes of power operation.

Another main object is to improve the safety related behaviour of the fuel elements during postulated accidental conditions, i.e. during a loss of coolant accident (LOCA).

Still another main object is to realize these improvements by adopting the established design and performance criteria of the conventional fuel elements and by applying the established manufacturing techniques of the elements and its components. The invention thus claims to be fully conformative with the fuel production resources and engineering know-how presently available.

The invention resides in the improvement that the cladding tube of the fuel element on its cylindrical inner surface is provided with a plurality of slightly protruding spacing elements of suitable shape and distribution. Said elements have for a main purpose to prevent creation of an extensive mechanical contact between said inner surface and the cylinder surfaces of the fuel pellets. Moreover, said elements have for a purpose to distribute the contact forces between the pellet and the cladding tube in a suitable way. They also are somewhat deformed under the engaging pressure, particularly at the pellet edges.

The invention will now be more closely described by examples of non-limiting embodiments of the nuclear fuel element of the invention. These embodiments are illustrated in the appended drawings, wherein the same reference numerals refer to the same details in the different drawing figures.

In the drawings

Figure 1:
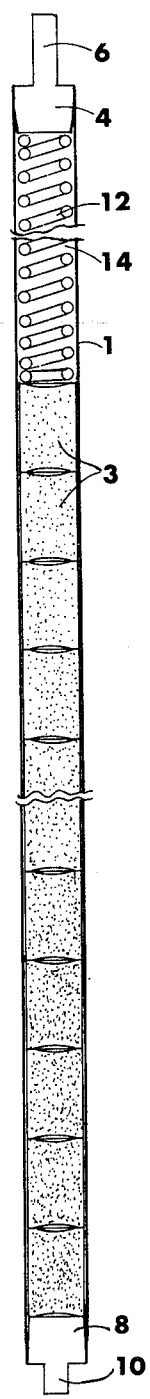
FIG. 1 shows a typical LWR fuel element in axial cross section. (The invention is, however, not apparent from this particular view).

The fuel element as shown in FIG. 1 conforms in all details — except for the spacing elements on the inside surface of the cladding tube — with a standard type LWR fuel element. The sintered pellets 3 of the encapsuled column are thus center-less ground to very precise diameter dimensions, generally within a tolerance range of ± 0.010 mm, the pellet diameter being of the order of 8–12 mm depending on the actual design. The pellet heights can vary from 8–20 mm and the end surfaces of the pellets are often made concave, "dished", to minimize the axial thermal expansion of the pellet column during approach to power. The full pellet column height is quite considerable, usually of the order of about 4 meters. The cladding tube 1 is made of a zirconium alloy, generally Zircaloy, like the two end plugs 4 and 6. The end plugs are provided with axially protruding pins 6 and 8, respectively. Said pins 6, 8 have for a purpose to maintain the fuel element in a fixed position in the reactor in a conventional manner. The tube 1 fits around the pellet column with a certain cold assembly annular (radial) gap clearance, f.i. within the range of about 0.07 to 0.15 mm. A particular gap tolerance is typically ± 0.05 mm . (In this disclosure, regarding the dimensions of this annular gap between cladding and pellets, reference is always made to the nominal cold assembly clearance between the circular nominal inner periphery of the cladding tube, disregarding the spacing elements, and the outer cylinder surface of the fuel pellets). These precise small gap dimensions are requested for minimizing the temperature drop during operation and simultaneously avoiding a more severe mechanical interaction, which represents a potential source of performance problems in the conventional LWR fuel element. During operation the cold assembly gap closes up more or less, depending on actual heat rating and extent of burn up. Often circumferential ridges form on the cladding surface at the positions of the pellet-pellet interfaces, due to mechanical interactions and distortion — "hour-glassing" — of the individual pellets. In the severe case clad fractures develop at these ridges in conventional prior art fuel elements.

To improve the annular gap heat transfer helium gas is added to the void volume of the fuel element. In PWR fuel elements, this helium gas is presently pre-pressurized for the purpose of preventing an early creep down of the cladding tube onto the pellet column during operation.

Again referring to FIG. 1, a plenum space (14) is arranged for accomodating released fission gases and excess helium gas. Also a spring coil 14 acting on the pellet column is located in this plenum space. This spring coil 14 has mainly for its purpose to keep the fuel pellets in place during transportation and handling of the fuel element but it should be noted that the spring cannot prevent axial pellet separation under operation.

Figure 2:
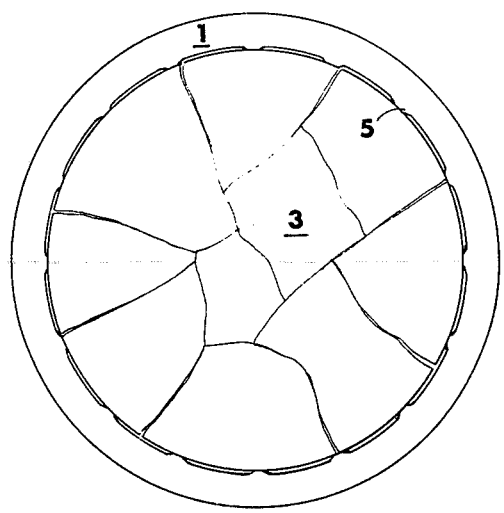
FIG. 2 shows in enlargement a cross section through the fuel element of FIG. 1 made in conformity with the invention, the section being taken across a nuclear fuel pellet therein.

The protruding parts or spacing elements on the inner surface of the cladding tube which, advantageously, are made integral with said tube, are suitably shaped as axially extending, mutually parallel ribs 5, f.i. in conformity with the embodiment of FIG. 2. It is to be understood, although not clear from the FIGS. that the spacing elements in the form of such axially or longitudinally extending ribs extend along the fuel element along the entire length of the cladding tube, at least along the part of the tube bore occupied by the pellet column. Within the scope of the invention, also other form of spacing elements, for instance a multitude of properly arranged protruding warts, are conceivable. The detailed shaping of the interior profile of the cladding tube may, in each individual case, be adapted to a plurality of possible embodiments in the manufacture.

Except for these distance elements 5 on the inside surface of the cladding tube 1, the fuel element conforms in all respects with the conventional fuel element design. For the geometrical dimensioning this means that the radial height of the distance elements must be at a maximum equal to the normal cold assembly annular gap, f.i. at most about 0.1 mm and preferably at most about 0.05 mm, in order to achieve an acceptable temperature drop across the remaining gap during full power operation. A practical lower limit of the radial height of the spring elements is about 0.005 mm. As a paradox — as will be seen below — the presence of the distance elements will permit a substantial reduction of this normal cold clearance gap to about half its value or less. Thus a certain improvement in heat transfer capability can be obtained by doing so. Also the shape of the distance elements becomes important with respect to heat transfer and distribution of the interaction forces. The shape must also be adapted to the selected fabrication technique, preferably to the standard type tube reducing technique through rock rolling on a mandrel.

Figure 3:
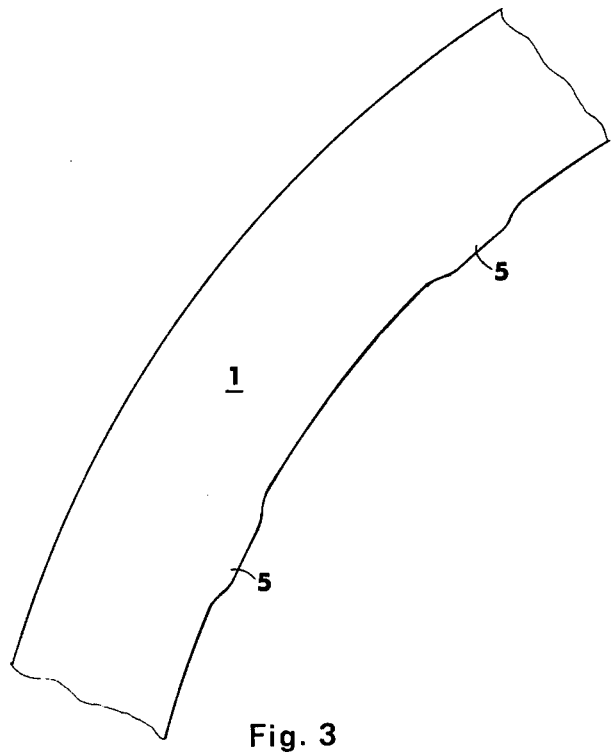
FIGS. 3–5 show details of different embodiments of the cladding tube of the fuel element of the invention.

The cross-sectional profile of one single, longitudinally extending spacing element may be given different shapes as is clear from FIGS. 2–5. Thus, FIG. 2 shows axially extending spacing elements 5 having, in cross-section, a trapezoid shape. FIG. 3 shows in more detail an enlarged view said spacing elements of FIG. 2 demonstrating that each spacing element 5 is rounded at its base and has an inwardly facing plane peak surface.

Figure 4:
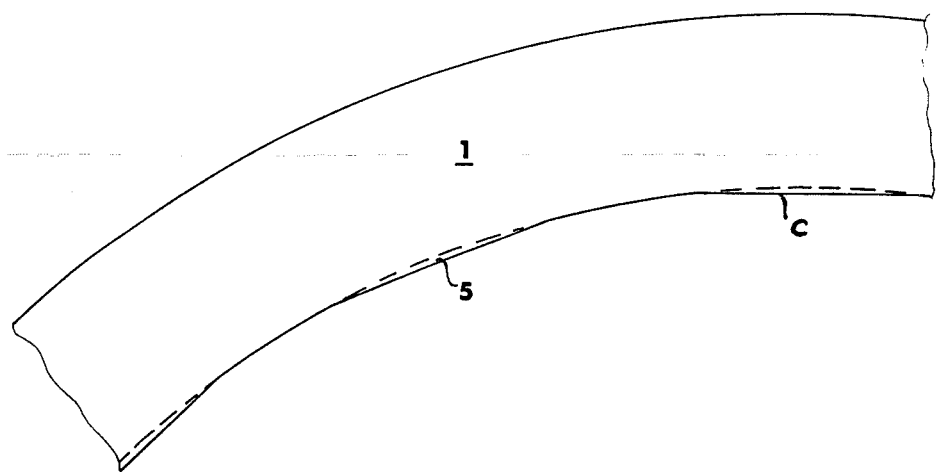

FIG. 4 shows in an enlarged view a detail of a cladding tube 1 embodying the invention. In this embodiment the longitudinally extending spacing elements 5 have in a cross-section a shape conforming to a circle segment formed between the circular inner periphery of the cladding tube 1 and a chord C drawn on the circle corresponding to the cladding tube bore. This embodiment is of a particular interest due to the fact that it enables small tolerances to be obtained with regard to the radial height of the ribs 5 due to its geometrical relation with the circumferential width of the rib which is significantly greater and thus possible to control with a great precision in the manufacturing of the tubing. This means that the cross-section of the ribs 5 as shown in FIG. 4 is particularly useful within the smaller range of radial heights, i.e. below about 0.02 mm.

Figure 5:
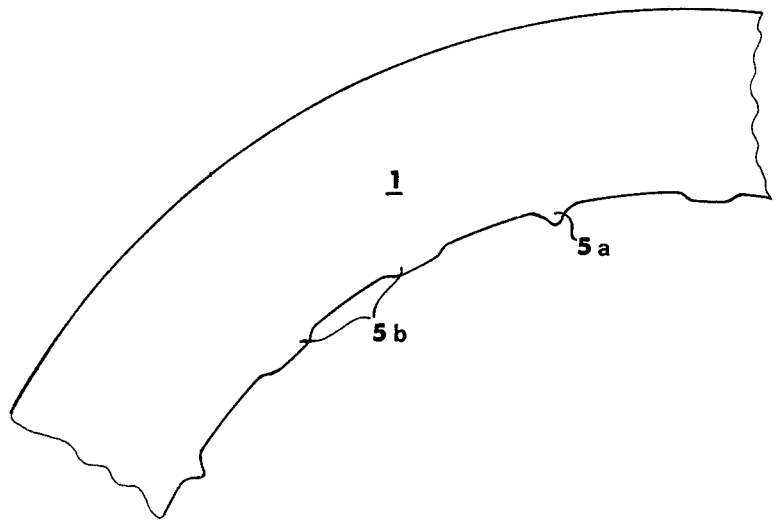

FIG. 5 shows an embodiment, wherein the spacing elements 5a, 5b have been given different cross-sectional profiles in one and the same cladding tube. Thus, each third spacing element 5a in the embodiment according to FIG. 5 has a relatively narrow and high profile to impart a small resistance to deformation and thereby maximum axial fixation of the pellet. The intermediate spacing elements 5b have a relatively wide and low profile to give better resistance to deformation and to improve the heat transfer from the nuclear fuel to the cladding tube.

As seen in cross-section, the spacing elements may at their bases have for instance an extension corresponding to about half the wall thickness of the cladding, but also other dimensions are conceivable. The contact line of the cross-sectional profile with adjacent fuel pellets may take different widths depending on the profile shape and the degree of deformation of the cross-sectional profile under operation.

The number of spacing elements provided on the inner surface of the cladding tube may vary within rather broad ranges. However, with regard to axially extending ribs as per the embodiment shown in FIGS. 2–6 of the drawings, a practical lower limit is 3, since this is the minimum number of ribs which will provide for centering of the nuclear fuel pellets within the cladding tube. Of course, this minimum number calls for an even circumferential distribution of the ribs on the inner surface of the cladding tube. Depending upon the technique for manufacturing the ribs, their radial height, their cross-sectional shape etc. different numbers of ribs can be used. A practical range for most purposes considering also distribution of interaction forces and heat transfer is 8 to 64 ribs, whereas a preferred range is 12 to 36 and a particularly useful range is 16 to 32.

To optimize the heat transfer between nuclear fuel and cladding it is desirable not only to operate with smallest possible annular gap but also to obtain a certain contact area between the ribs and the fuel pellets. In this connection it has been found that the circumferential width of the contact surface between each rib and pellet should be at a minimum of about 0.1 mm. However, it should be observed that this is the desired minimum requirement as regards the contact surface between rib and pellet and that in operation this figure may be significantly higher.

The spacing elements designed and arranged in conformity with the invention influence the conditions of mechanical engagement in operation between pellet and cladding in a way which prevents damages in several respects. Particularly, the axially extending spacing elements (ribs) oriented in parallel give pronounced advantages and therefore constitute the preferred embodiment. In the following the invention is enlightened with reference to these types of embodiments.

The influence of the spacing elements on fuel performance is first considered in connection with the initial contact between pellet and cladding tube when raising the heat rating of the fuel element. As compared to a cladding tube without interior spacing elements and using the same annular gap size mechanical contact will now commence at a lower power level. The higher the height of the spacing elements the lower the power of contact. The height measure in question is suitably adjusted so that mechanical contact with a certain plastic deformation of the spacing elements is created at normal operational power. In this context it should be pointed out that only a minimum of mechanical interaction between pellets and cladding is normally aimed for in conventional LWR fuel elements.

Figure 6:
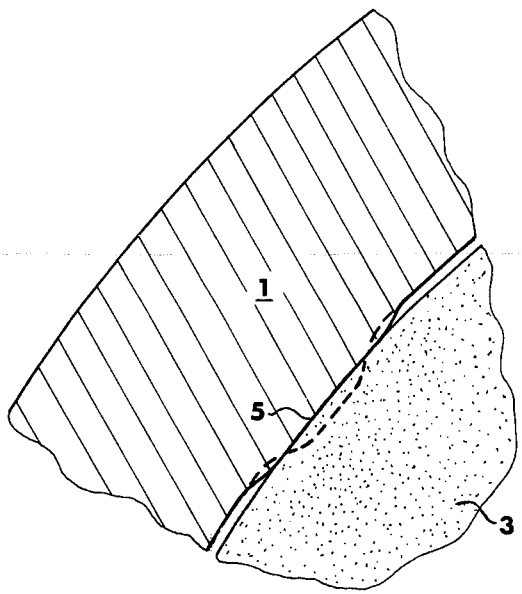
FIGS. 6 and 7 illustrate in enlarged views the conditions around the area of transition between two nuclear fuel pellets in connection with an embodiment of the fuel element of the invention. In this disclosure the expression "cross section" as used f.i. in relation to FIGS. 2–6 means a section through the element or tube taken in a plane perpendicular to the centre line of the fuel element.
Figure 7:
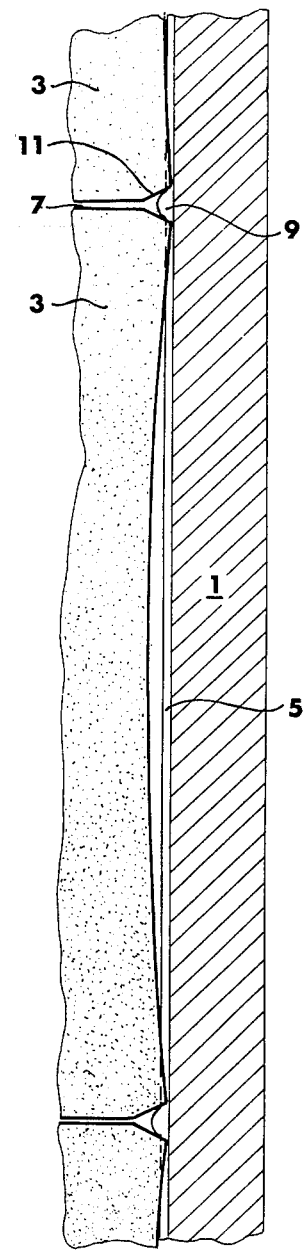

A cross-section and a longitudinal section of the spacing elements deformed in this manner are schematically illustrated in FIGS. 6 and 7, respectively. It is clear from the cross-section of FIG. 6, that the profile of the spacing element 5 undergoes a certain delimited plastic deformation, indentation, in view of the fact that the pressure of engagement initially exceeds the compression strength of the material of the spacing element. With increasing indentation the compression resistance is rapidly increasing in view of the profile shape, so that continued indentation is progressively hampered. From the longitudinal section of FIG. 7 illustrating the cladding tube 1 at pellet-pellet interfaces, it is clear how each fuel pellet deforms the longitudinally extending spacing element 5 so that a marked discontinuity 9 is created therein in the space 7 between the pellets 3. Advantageously, the pellets are made with chamfered edges 11 according to FIG. 7 to enable suitable shaping of this part or discontinuity 9 having for its purpose to prevent axial relative movement between pellet and cladding tube. The indentation in the longitudinal profile of the spacing element 5 clearly reflects the hour-glass-like shape of pellets 3. Thus, the spacing elements prevent local direct contact between the interior of the cladding tube and the sharp pellet edges at their end surfaces.

The influence of the spacing elements on the situation in said type of mechanical interaction leading to cladding failure when a crack in the rigid ceramic pellet body opens up, for instance during a sudden power increase, will now be considered.

In operation the nuclear fuel pellets 3 of the fuel elements undergo a certain cracking in view of the temperature fall across the pellet. A typical crack pattern may present a plurality of radially extending cracks in a cross-section through the pellet 3 according to FIG. 2. In a longitudinal section through the same pellet also a number of transverse cracks may be observed, however, in a smaller number. In operation all these crack paths remain somewhat widened towards the periphery.

At a power increase these existing pellet crack openings are further widened at the same time as new cracks may form. Under such circumstances and in the absence of spacing elements a fracture may now arise in the cladding tube in the locally stressed area just opposite to the pellet crack opening in the contact zone. The presence of the spacing elements will, however, radically affect the failure mechanism attributed to the radial cracks which are most detrimental according to experience.

Firstly, it will be noted that the major part of the pellet cracks open up in the area between the widely distributed spacing elements 5, where none or insignificant contact exists between pellet and cladding. Cf. FIG. 2. Therefore, the crack widening cannot result in local stress peaks and deformation in the opposite area of the inside of the cladding, but the movement will merely be transmitted by the friction forces at the separate spacing elements 5 as a general stretching of the whole tube section therebetween. A certain absolute stretch of this kind is, of course, better absorbed by the tube material the longer the distance of stretching is relative to the width of the crack widening, i.e. the more separated the spacing elements 5 are.

Secondly, the crack openings located between the spacing elements are activated to open much easier than those few cracks happening to be located in the contact zone with the spacing elements. The latter have namely — in addition to the deformation resistance of the cladding — also to overcome the resistance of friction.

Considering now the transverse crack pattern of the ceramic fuel body it may be noted from experience that these cracks in the absence of spacing elements normally do not create fractures in the cladding material on power increase. The cause to this is probably the fact that the pellet crack widening is counteracted by the simultaneously occurring "hour-glass-formation".

The destructive forces normally transferred to delimited areas of the cladding tube as a result of such local relative movements accompanying mechanical interaction will thus be strongly counteracted and therefore little if at all damaging when using the spacing element construction of the invention.

This also means that other phenomena of a similar nature connected to this type of mechanical interaction, such as fatigue and stress corrosion, are also counteracted.

As concerns the other kind of defect development caused by repeated relative axial movement between pellets and cladding under operation, namely pellet separation and abnormal length increase by ratchetting, the useful function of the same spacing element is of a simple nature. Already at the first power increase to such a power level that mechanical contact is reached between pellets and spacing elements, the cross-sectional profile of the spacing elements are indented to some extent, particularly at the pellet intersection areas — as previously stated. At the same time the intermediate volume of the spacing elements at the pellet-pellet interfaces remain relatively untouched or even somewhat pushed height-wise. Thus, between the end surfaces of the pellets sharp discontinuities (cf. 9 in FIG. 7) or protruding small platforms are formed in the spacing elements. Each separate pellet therefore remains fixed in axial position and is prevented to move axially relative to the cladding tube.

The number of longitudinally extending spacing elements required to provide such axial fixation is highly delimited, but should extend to at least three evenly distributed over the cross-section.

Thus, the pellets now cannot assist in the creation of axial separation defects of the kind previously referred to by densification or growth. Moreover, ratchetting will be prevented. With pellets axially locked in this way an additional power increase results in axial stretching of the cladding tube by each individual pellet between said platforms, and the stretch will thus be evenly distributed along the whole length of the cladding tube. In the absence of spacing elements there is a risk that the same stretch will be localized to a single portion of the cladding, where a rupture may take place.

Interior spacing elements in conformity with the invention also result in a number of other important advantages from the point of view of the proper performance of the fuel element. Thus, i.a. sticking between pellet and cladding caused by the cementing action of certain fission products so as to essentially increase the friction coefficient is prevented. Moreover, discrete pellet fragments are prevented from radial and outward displacement to direct intimate contact with the inside of the cladding tube as a result of for instance vibrations or of handling the fuel element when the reactor is shut off. Experience shows that such radial displacements of the pellet fragments may result in additional diametral expansion of the cladding tube when increasing the power. In principal the same beneficial effect of the spacing elements relates to the radial swelling of the fuel pellets which can take place at high burn up levels.

The additional advantages just mentioned appear already at very slightly protruding spacing elements, i.e. at a height measure of at least the order of magnitude of 0.001 mm or 1 micron. The distribution of the spacing elements should be relatively even in a given cross-section at the same time as the number should be relatively large, i.e. about the same as that which is optimal when dimensioning against the effect of aforementioned type of mechanical interaction.

A further advantage of the invention is related to the small residual gap sections between pellet and cladding tube and resides in the fact that chemically aggressive substances, for instance fission gases and hydrogen-containing gases which may react with the cladding material and destructively influence the same by stress corrosion or hydride formation, will be diluted in the gap space by filler gas present, such as helium or other inert gases, thereby lowering their chemical activity.

The radial gap sections thus forming longitudinal channels along the whole length of the fuel element result in continuous communication of the filler gas with the so-called plenum-volume above the pellet pile inside the cladding tube. By thermal convection etc. in the gas gaps this communication means that fractions of the filler gas continuously flow up and down in the gaps while admixing with the filler gas in the plenum-space. The contaminated filler gas from the gaps is thus diluted and replaced by clean filler gas. In a manner known per se the filler gas may be freed from contaminants, for instance from hydrogen gas by means of a "getter" substance applied in the plenum space. In the same manner the filler gas may be brought into contact with other substances supplied to the fuel element, for instance activated carbon, to chemically effect the composition of the filler gas.

An advantage of considerable importance with respect to safety relates to these longitudinal channels between the pellet column and cladding tube due to the presence of the distance elements. Under a postulated LOCA, cooling water is injected into the reactor core in order to effectively cool the fuel elements and prevent melt down. The temperature, at which destruction or swelling (ballooning) of the fuel elements occur, sets the requirement of the safety system. The communication of the enclosed gas along the fuel rod, which the spacer elements facilitate, will effectively reduce the tendency to such ballooning or destruction, as the communication with the cooled gas of the plenum volume will prevent an extensive pressure build-up locally along the fuel elements.

Further advantages relate to the radial centering and the aligning of center axis of the separate pellets with the center line of the cladding tube as provided by the spacing elements when assembling the fuel element. This results i.a. in lowering the incidence of interior scratches and other damages to the interior surface of the cladding tube in for instance manufacture and increase of power. The oxide film or purposely applied surface coating having for its purpose to protect the material of the cladding tube to chemical attack by fission gases or the like in the filler gas will thereby remain intact in the space between the spacing elements.

This feature of the spacing element to protect the inside against mechanical damages caused by minor geometrical deficiencies of the pellets also admit accepting some higher variations in pellet diameter, nature of the pellet surfaces and shape of pellets. Thus, for instance unground pellets may be used. Moreover, smaller nominal gaps between pellets and cladding can be accepted in view of the fact that greater stretches may be tolerated. This in turn results, quite unexpectedly, in an improved heat transfer, as compared to conventional fuel elements, and thus a lowered center temperature of the fuel pellets. This is an advantage from a safety point of view.

The spacing elements also delimit the oval flattening of the cladding tube taking place particularly at high operational pressures. The oval flattening may otherwise lead to higher local deformation in the circumferential ridge formations at the pellet interface portions. This may result in ratchetting phenomena and fatigue stresses.

Considering the controlled mechanical interaction between fuel pellets and cladding provided by the distance elements, it also becomes possible to abandon the pre-pressurization called for in PWR fuel elements.

The design solution described herein while particularly considering the problems connected with water-cooled fuel elements are in principle also applicable to other types of fuel elements, for instance fuel elements clad with stainless steel for gas-cooled or sodium-cooled reactors.

The spacing elements are suitably made integral with the cladding tube and this can be provided as part of the ordinary tube manufacture, for instance in pilger step rolling or drawing operations. In this connection the mandrel tools may be provided with longitudinally extending grooves corresponding to the cross-section of the spacing element.

The experience obtained so far of manufacturing the cladding tubing of the design according to the invention confirms that the conventional tube reducing procedure is well suited for this purpose. However, in order to allow the use of the ordinary ultrasonic equipment in the searching for defects, like crackings and scratches, the distance elements will cause disturbing signals if the size in height and the sharpness of the profile exceed certain values. The dimensions and profiles suggested here are found fully acceptable in this respect. From this point of view the circle segment profile is preferred (FIG. 4).

The invention will now be further described by specific examples. It is to be understood, however, that these examples are not to be construed as delimiting the scope of the invention, which in this respect is defined in the appended claims. Modifications and variations will, of course, be obvious to those skilled in the art.

EXAMPLE 1

A typical BWR fuel element of the design as illustrated in FIGS. 1 and 2 is manufactured using conventional established fabrication procedures. Uranium oxide pellets enriched to about 2.5% are sintered to approximately 95% of the theoretical density using a sintering atmosphere of hydrogen at about 1700° C.

The pellets are then centerless ground to specified dimensions and dried in vacuum before loading into the cladding tube.

Cladding tubes made from Zircaloy-2, having an inner diameter of 10.70 mm and a wall thickness of 0.8 mm, are produced in a tube reducing mill by step rolling. In the final pass a special mandrel is used which is provided with 24 tiny parallel longitudinally extending grooves machined into the mandrel surface. The individual grooves, evenly distributed around the periphery of the mandrel, are all of the same cross-section and have a bell-shaped profile with a depth of 0.050 mm, a bottom width of about 0.10 mm and a top width of about 0.40 mm. The final pass using this special mandrel will provide the cladding tube on its inner surface with corresponding longitudinally extending ribs having a base width of about 0.40 mm and a top width of about 0.10 mm, the radial height thereof being 0.050 mm. The bore of the cladding tube is sandblasted and pickled and inspected for possible defects like cracks, foldings etc. Conventional ultrasonic equipment is used for this purpose. The signal pattern caused by the ribs results in a certain back-ground noise, which, however, is low enough to permit proper detection of possible defects in a conventional manner. The geometrical design of the interior of fuel element is the conventional one, i.e. the annular radial pellet to cladding gap is equal to 0.17 mm (excluding the radial height of the spacing elements) and the tolerance of the gap size is about ± 0.05 mm. The pellet height to pellet diameter ratio equals 1.5.

After insertion of the nuclear fuel pellets into the cladding tube, end plugs of Zircaloy-2 are sealwelded to the cladding tube using electron beam welding in vacuum. Through a tiny hole in one of the end plugs (not shown in FIG. 1) helium gas is introduced into the void space of the fuel element and sealed off using argon arc welding. No particular problems are encountered due to the presence of the protruding ribs, neither during loading of the pellets, nor during the welding of the end plugs to the cladding tube.

A number of fuel elements of the type as described above are introduced for short-term irradiation in a pressurized water loop of a test reactor and operated under pressure and temperature conditions representative of a conventional boiling water reactor, the power level being at a maximum of 650 w/cm. For control purposes some fuel elements, of conventional type, i.e. having no ribs on the inside surface of the cladding tube, are simultaneously irradiated.

The non-destructive post irradiating inspection reveals no significant difference in outside dimensions. Less distortions in the form of circumferential ridges are noted for the ribbed cladding tube, indicating smaller clad strains. The neutron radiographic examination, however, discloses a more extensive fragmentation of the fuel pellets, indicating a substantial fracturing effect of the ribs on the pellet. This effect is desirable in the sense as it will reduce the peak stress on the cladding as a result of mechanical pellet-cladding interaction.

For checking the efficiency of the ribs in locking the pellets in their axial position, the fuel elements are turned upside down and neutron radiographed once more. The results clearly demonstrate that the ribs do in fact lock the pellets in place, whereas the reference non-ribbed cladding tubes do not, i.e. the pellets fall down to some extent within the available empty space of the cladding tube of the reference element.

The destructive post irradiation examination confirms that the ribs of the cladding tubes have been plastically deformed by some flattening of the rounded peaks of the rib profiles, the circumferential flattening being of the order of 0.1 mm. Also, the afore-mentioned formation of cracks in the pellet bodies are frequently observed at these contact positions.

A very important finding of the metallographic examination is the fact that the central temperatures of the pellets — as indicated by the diametrical extent of the grain growth zone of the pellet material — remains nearly the same when comparing the ribbed fuel element with the control non-ribbed element. Approximately half the diameter is occupied by the grain growth zones in both cases at the heat rating of approximately 650 w/cm.

EXAMPLES 2–4

In the same manner as described in Example 1 above fuel elements are manufactured which are provided with longitudinally extending ribs having cross-sections according to FIGS. 3, 4 and 5, respectively. The same advantageous results are obtained as those demonstrated in Example 1, although the heat transfer is improved due to the broader contact surfaces between pellets and ribs.

With regard to the embodiment of FIG. 4 using ribs 5 having the shape of a circle segment formed between the circle periphery of the cladding tube bore and a chord, several advantages will be observed. Firstly, as indicated above, it is possible with a high degree of accuracy to obtain very small radial heights (less than 0.020 mm) of the ribs due to the advantageous high ratio between the circumferential width and the radial height of the rib. This in turn will permit the use of smaller cold assembly gaps. Secondly, this embodiment greatly facilitates the procedure of providing the mandrel used in manufacturing the cladding tube with the longitudinally extending recesses corresponding to the cross-section of the ribs 5. Thus, a mandrel of the desired shape can be made simply by grinding planar areas at regular intervals around the periphery of a circular body. At a maximum and with a given radial height of the ribs 5 the mandrel may be ground to form a regular polygon, which means that after the rolling no interior cylindrical areas are left on the inside of the cladding tube. In order to increase the contact area between pellet and cladding tube it is possible to make a final pass with a cylindrical mandrel having an outer diameter somewhat bigger than the inner diameter of the cladding tube corresponding to the maximum rib height, which will result in cylindrical concave recesses in the inwardly facing top surfaces of the ribs 5. Such final calibration of the ribs 5 is conceivable also with regard to the embodiment of FIG. 3. The result of such final shaping of the inwardly facing surface of the ribs 5 will result in further improvements of the heat transfer between pellets and cladding.

What is claimed is:

1. Nuclear fuel element for use in power producing nuclear reactors, comprising an axially elongated cladding tube or metal or metal alloy, a plurality of axially aligned cylindrically shaped solid bodies of the sintered oxide type which undergo fracturing under power operation into a number of fragments separated by crack paths which characteristically extend radially and remain open in the peripheral region of said fuel bodies, wherein the improvement comprises means for improving the heat-transfer between said fuel bodies and said cladding tube and for minimizing the creation of stress concentration in the wall of the cladding tube in that said cladding tube has a cylindrically shaped inner surface, at least 8 axially extending mutually parallel circumferentially spaced ribs formed on and extending radially inwardly from the cylindrically shaped inner surface, the radial dimension of said ribs inwardly from the cylindrically shaped inner surface of said cladding tube being at most about 0.05 mm and said ribs being spaced apart a sufficient distance to avoid coincidence of cracks and intimate contact between the inner surface of said cladding tubes and fuel bodies, the outer cylindrical surface of said fuel bodies and the inner surface of said cladding tube forming an annular gap therebetween having a width in the range from about the radial dimension of said ribs to about 0.15 mm.

2. Nuclear fuel element, as set forth in claim 1, wherein said cladding tube has a circular cylindrically shaped inner surface, each of said ribs, in cross-section extending perpendicularly of the axis of said cladding tube, has the shape of a segment of a circle formed between the circular inner surface of said cladding tube and a chord intersecting the circular inner surface.

3. Nuclear fuel element, as set forth in claim 2, wherein said ribs are equidistantly spaced apart on the inside surface of said cladding tube, and the number of said ribs being such as to form an inner contour in said cladding tube conforming to a regular polygon.

4. Nuclear fuel element, as set forth in claim 1, wherein at least three of said ribs are equidistantly spaced around the inner surface of said cladding tube and have a relatively narrow and high profile to impart a small resistance to deformation and thereby afford maximum axial fixation of the fuel bodies.

5. Nuclear fuel element, as set forth in claim 1, wherein said ribs, in cross-section perpendicular to the axis of said cladding tube, have a parallel trapeze-like shape.

6. Nuclear fuel element, as set forth in claim 1, wherein said ribs, in cross-section perpendicularly of the axis of said cladding tube, have a triangular shape with the radially inwardly directed apex of the triangular shape having a rounded peak.

7. Nuclear fuel element, as set forth in claim 1, wherein said ribs are formed integrally with said cladding tube.

8. Nuclear fuel element, as set forth in claim 1, wherein the radial dimension of said ribs inwardly from the inner surface of said cladding tube is at least 0.005 mm.

* * * * *